United States Patent
Eichbauer et al.

Patent Number: 6,083,611
Date of Patent: Jul. 4, 2000

[54] ROLL WRAP FILM

[75] Inventors: George N. Eichbauer, Conyers, Ga.; Robert J. Silver, Macedon, N.Y.

[73] Assignee: Tenneco Packaging, Inc., Evanston, Ill.

[21] Appl. No.: 08/968,999

[22] Filed: Nov. 12, 1997

[51] Int. Cl.$^7$ ...................................................... B32B 27/00
[52] U.S. Cl. ............................................ 428/213; 428/352
[58] Field of Search ...................................... 428/352, 354, 428/355 AC, 355 EN, 515, 516, 520, 213, 220; 53/399, 441

[56] References Cited

U.S. PATENT DOCUMENTS

| | | | |
|---|---|---|---|
| 3,645,992 | 2/1972 | Elston | 260/80.78 |
| 3,748,962 | 7/1973 | Hilkert et al. | 90/4 |
| 3,986,611 | 10/1976 | Dreher | 206/386 |

(List continued on next page.)

FOREIGN PATENT DOCUMENTS

| | | |
|---|---|---|
| 0 600 425 | 11/1993 | European Pat. Off. . |
| WO 92/17539 | 10/1992 | WIPO . |
| WO 94/14855 | 7/1994 | WIPO . |
| WO 94/25271 | 11/1994 | WIPO . |
| WO 94/26816 | 11/1994 | WIPO . |

OTHER PUBLICATIONS

"Advantages of Metallocene Ethylene Polymer Resin Blends in Blown and Cast Films", *Research Disclosure*, Aug. 1995, pp. 565–573.

"Advantages of Metallocene Ethylene Polymer Resin Blends in Cast Film", *Research Disclosure*, Aug. 1995, pp. 556–557.

"Advantages of Metallocene Ethylene Polymer Resins in Blown and Cast Stretch Films", *Research Disclosure*, Aug. 1995, pp. 539–545.

Chowdhury, et al., "Polymers by Blueprint: Metallocene catalysts, the biggest thing to hit plastics since LLDPE, transform workhorse resins into engineering plastics," *Chemical Engineering* (Apr. 1993), pp. 34–39.

Leaversuch, R., "LPDE, mPE vie in Flexible Film Market", *Modern Plastics*, Sep. 1994, pp. 23 & 25.

Product Literature, Dow Chemical Company, "Dow Resins for Stretch Film Applications–An Overview", p. 1.5, Oct., 1994.

Product Literature, Dow Chemical Company, "Dow Skin Resins for Cast Stretch Film Applications", p. 3.1–3.4, Oct., 1994.

Product Literature, Dow Chemical Company, "ENGAGE Polyolefin Elastomer for Industrial Collation Packaging", KC 8852, May, 1994.

Product Literature, *To Give Your Customers' Used Stretch Film A New Lease On Life, Turn The Page*, Mobil, 4 pgs. (1993).

(List continued on next page.)

*Primary Examiner*—Paul Thibodeau
*Assistant Examiner*—D Lawrence Tarazano
*Attorney, Agent, or Firm*—Jenkens & Gilchrist

[57] ABSTRACT

A multilayer, thermoplastic roll wrap film containing at least three polymeric film layers and comprised of an outer cling layer, a non-cling outer layer, and at least one inner polymeric layer. The roll wrap film has at least one inner polymeric layer, located between the outer cling layer and then non-cling outer layer. The non-cling outer layer is preferably comprised of a high pressure, low density polyethylene resin having a melt index of from about 0.5 to about 6. The inner polymeric layer comprises a low polydispersity polymer. The low polydispersity polymer has a polydispersity of from about 1 to about 4, a melt index ($I_2$) of from about 0.5 to about 10 g/10 min., and a melt flow ratio ($I_{20}/I_2$) of from about 12 to about 22. The roll wrap film has a transverse tear resistance of at least 400 grams/mil as measured by ASTM D1922, a machine direction tear resistance as measured by ASTM D1922 of at least 150 grams/mil and a F-50 dart drop of at least 600 grams. It is contemplated that additional layers may be added to the present invention.

80 Claims, 1 Drawing Sheet

U.S. PATENT DOCUMENTS

| | | | |
|---|---|---|---|
| 4,011,382 | 3/1977 | Levine et al. | 526/96 |
| 4,050,221 | 9/1977 | Lancaster, III et al. | 53/211 |
| 4,076,698 | 2/1978 | Anderson et al. | 526/348.6 |
| 4,163,831 | 8/1979 | Gessell | 526/153 |
| 4,205,021 | 5/1980 | Morita et al. | 525/240 |
| 4,302,565 | 11/1981 | Goeke et al. | 526/88 |
| 4,302,566 | 11/1981 | Karol et al. | 526/125 |
| 4,359,561 | 11/1982 | Fraser et al. | 526/88 |
| 4,399,173 | 8/1983 | Anthony et al. | 428/35 |
| 4,399,180 | 8/1983 | Briggs et al. | 428/212 |
| 4,418,114 | 11/1983 | Briggs et al. | 428/218 |
| 4,461,873 | 7/1984 | Bailey et al. | 525/240 |
| 4,511,609 | 4/1985 | Craver et al. | 428/35 |
| 4,514,465 | 4/1985 | Schoenberg | 428/339 |
| 4,522,987 | 6/1985 | Hogan et al. | 526/106 |
| 4,565,720 | 1/1986 | Yaeo et al. | 428/35 |
| 4,574,104 | 3/1986 | Aishima et al. | 428/220 |
| 4,588,650 | 5/1986 | Mientus et al. | 428/516 |
| 4,808,561 | 2/1989 | Welborn, Jr. | 502/104 |
| 4,833,017 | 5/1989 | Benoit | 428/323 |
| 4,837,075 | 6/1989 | Dudley | 428/220 |
| 4,871,523 | 10/1989 | Datta et al. | 423/265 |
| 4,871,705 | 10/1989 | Hoel | 502/117 |
| 4,925,821 | 5/1990 | Chang | 502/107 |
| 4,925,825 | 5/1990 | Tachi et al. | 502/309 |
| 4,937,301 | 6/1990 | Chang | 526/128 |
| 5,001,205 | 3/1991 | Hoel | 526/128 |
| 5,006,500 | 4/1991 | Chang | 502/107 |
| 5,017,655 | 5/1991 | Kase et al. | 525/127 |
| 5,019,315 | 5/1991 | Wilson | 264/171 |
| 5,026,798 | 6/1991 | Canich | 526/127 |
| 5,032,652 | 7/1991 | Chang | 526/129 |
| 5,049,423 | 9/1991 | German, Jr. | 428/35.2 |
| 5,079,205 | 1/1992 | Canich | 502/117 |
| 5,084,534 | 1/1992 | Welborn, Jr. et al. | 526/160 |
| 5,085,927 | 2/1992 | Dohrer | 428/220 |
| 5,110,663 | 5/1992 | Nishiyama et al. | 428/195 |
| 5,124,418 | 6/1992 | Welborn, Jr. | 526/114 |
| 5,173,343 | 12/1992 | Arvedson et al. | 428/34.9 |
| 5,183,867 | 2/1993 | Welborn, Jr. | 526/114 |
| 5,206,075 | 4/1993 | Hodgson, Jr. | 428/216 |
| 5,248,547 | 9/1993 | Wilson | 428/218 |
| 5,272,016 | 12/1993 | Ralph | 428/516 |
| 5,273,809 | 12/1993 | Simmons | 428/212 |
| 5,278,272 | 1/1994 | Lai et al. | 526/348.5 |
| 5,279,872 | 1/1994 | Ralph | 428/34.9 |
| 5,283,128 | 2/1994 | Wilhoit | 428/516 |
| 5,296,580 | 3/1994 | Matsunaga et al. | 528/502 |
| 5,334,428 | 8/1994 | Dobreski et al. | 428/34.9 |
| 5,358,792 | 10/1994 | Mehta et al. | 428/516 |
| 5,374,459 | 12/1994 | Mumpower et al. | 428/36.7 |
| 5,376,439 | 12/1994 | Hodgson et al. | 428/220 |
| 5,380,810 | 1/1995 | Lai et al. | 526/352 |
| 5,382,631 | 1/1995 | Stehling et al. | 525/240 |
| 5,395,471 | 3/1995 | Obijeski et al. | 156/244.11 |
| 5,397,613 | 3/1995 | Georgelos | 428/36.7 |
| 5,397,640 | 3/1995 | Georgelos et al. | 428/349 |
| 5,399,426 | 3/1995 | Koch et al. | 428/335 |
| 5,407,732 | 4/1995 | Dokurno | 428/213 |
| 5,419,795 | 5/1995 | Wood et al. | 156/184 |
| 5,419,934 | 5/1995 | Wilson | 428/34.9 |
| 5,420,220 | 5/1995 | Cheruvu et al. | 526/348.1 |
| 5,431,284 | 7/1995 | Wilson | 206/597 |
| 5,451,450 | 9/1995 | Erderly et al. | 428/220 |
| 5,451,468 | 9/1995 | Seiler et al. | 428/515 |
| 5,460,861 | 10/1995 | Vicik et al. | 428/34.9 |
| 5,462,807 | 10/1995 | Halle et al. | 428/500 |
| 5,482,770 | 1/1996 | Bekele | 428/339 |
| 5,482,771 | 1/1996 | Shah | 428/349 |
| 5,491,019 | 2/1996 | Kuo | 428/213 |
| 5,523,136 | 6/1996 | Fischer et al. | 428/35.2 |
| 5,530,065 | 6/1996 | Farley et al. | 525/240 |
| 5,543,223 | 8/1996 | Shah | 428/349 |
| 5,558,930 | 9/1996 | DiPoto | 428/216 |
| 5,576,038 | 11/1996 | Moore et al. | 426/127 |
| 5,591,390 | 1/1997 | Walton et al. | 264/456 |
| 5,595,050 | 1/1997 | Koch et al. | 53/441 |
| 5,617,707 | 4/1997 | Simmons | 53/441 |
| 5,681,523 | 10/1997 | Cobler et al. | 264/565 |
| 5,749,202 | 5/1998 | Eichbauer | 53/399 |
| 5,752,362 | 5/1998 | Eichbauer | 53/399 |
| 5,814,399 | 9/1998 | Eichbauer | 428/220 |
| 5,902,684 | 5/1999 | Bullard et al. | 428/515 |
| 5,907,942 | 6/1999 | Eichbauer | 53/441 |
| 5,907,943 | 6/1999 | Eichbauer | 53/441 |
| 5,922,441 | 7/1999 | Eichbauer | 428/213 |
| 5,976,682 | 11/1999 | Eichbauer | 428/213 |
| 5,998,017 | 12/1999 | Eichbauer | 428/343 |
| 6,013,378 | 1/2000 | White et al. | 428/516 |

OTHER PUBLICATIONS

Schut, "Competition for Metallocenes Could Turn Ugly," *Plastics World* (Jan. 1995), pp. 33–36.

Product literature, *Recycling Loop For Stretch Film*, Mobil, 2 pages (No Date).

Product literature, *Stretch Film Recycling*, Mobil, 2 pages (No Date).

Product literature, *Paper Roll Protection For The Harshest Conditions*, Mobil, 8 pages (No Date).

Product literature, *Trancel: K/F Kraft And Film Roll Wrapping System*, Trancel, 8 pages (No Date).

Product literature, Trancel: Combination Roll Wrapping System, Trancel, 8 pages (No Date).

ions and methods for their use. In particular, the present invention is directed to roll wrap film having higher tensile strength, enhanced tear resistance, abrasion resistance, uniform stretching characteristics, superior puncture resistance, high total energy dart drop, superior optical qualities, and overall strength.

ROLL WRAP FILM

FIELD OF INVENTION

The present invention is directed to roll wrap film and methods for their use. In particular, the present invention is directed to roll wrap film having higher tensile strength, enhanced tear resistance, abrasion resistance, uniform stretching characteristics, superior puncture resistance, high total energy dart drop, superior optical qualities, and overall strength.

BACKGROUND OF THE INVENTION

The use of thermoplastic roll wrap films for protecting goods, and in particular, large paper roll stock is a significant commercially important application of polymer film, including generically, polyethylene. However, a factor affecting their acceptance is the machine performance of the roll wrap films.

In one commercial application, roll wrap film of the present invention is used as primary protection of a mill roll of fine paper. In this application, the roll wrap film is typically applied in multiple layers around such fine paper. These rolls of fine paper typically include bar codes which contain information such as product type, purchase order number and weight. Roll wrap film may be applied in conjunction with pre-stretch machines and non pre-stretch machines. The use of a pre-stretch machine tends to cause severe "tiger striping" in many roll wrap films because of the lack of uniform stretching.

Tiger striping is a condition in the stretched films where bands or patterns across the films have not been stretched as compared to a remainder of the roll wrap film. This condition is caused by the high strain on the stretched roll wrap film. This non-uniform stretching results in a "wrinkling" pattern in the roll wrap film which can cause distortion in the scanned reading on the above-described bar codes. In addition, the tiger-striped film has less effective cling properties and may even cause damage to the wrapped product.

Some of the properties desired of a good roll wrap film are as follows: good cling or cohesion properties, high puncture resistance, good machine direction tear resistance, good transparency, low haze, low stress relaxation with time, high resistance to transverse tear especially when under machine direction tension, low specific gravity and thus high yield in area per pound, good tensile toughness, high machine direction ultimate tensile strength, high machine direction ultimate elongation, and low modulus of elasticity.

A need exists to develop superior roll wrap films having excellent machine performance with excellent stretched clarity and uniform stretched gauge, while still maintaining other important roll wrap film properties.

SUMMARY OF THE INVENTION

The present invention is a multilayered roll wrap film which has excellent machine performance, excellent puncture resistance, higher tensile strength, enhanced tear resistance, abrasion resistance, uniform stretching characteristics, good cling properties, good optical qualities, and overall strength.

The inventive film comprises a cling layer, at least one inner polymeric layer and a non-cling layer. The cling layer may be constructed of olefin polymer resins. The cling layer is preferably constructed with a ethyl methyl acrylate copolymer.

The inner polymeric layer, located at a position between the cling layer and the non-cling layer, comprises a polymer having a low polydispersity. The low polydispersity polymer has a polydispersity of from about 1 to about 4, a melt index ($I_2$) of from about 0.5 to about 10 g/10 min., and a melt flow ratio ($I_{20}/I_2$) of from about 12 to about 22. The inner polymeric layer(s) are preferably produced utilizing metallocene catalyst polymerization techniques. The inner polymeric layer may comprise the low polydispersity polymer with other resins.

The non-cling layer is located as an outer layer adjacent to the inner polymeric layer. The non-cling layer is preferably comprised of a high pressure, low density polyethylene (HPLDPE) having a density in the range of from about 0.88 to about 0.935 with a melt index of from about 0.5 to about 6, and preferably from about 1 to about 3 g/10 min.

The film is constructed with at least three layers; additional layers are contemplated. For instance, additional inner polymeric layers may be incorporated into the film between the cling layer and the non-cling layer, where such layers are constructed with the same or different metallocene-catalyzed polyethylene resins as the first inner polymeric layer.

The multilayer film of the present invention has a transverse tear resistance of at least 400 grams/mil as measured by ASTM D1922, a machine direction tear resistance as measured by ASTM D1922 of at least 150 grams/mil, and a F-50 dart drop of at least 600 grams as measured by ASTM D1709.

DESCRIPTION OF ILLUSTRATIVE EMBODIMENTS

Figure 1:
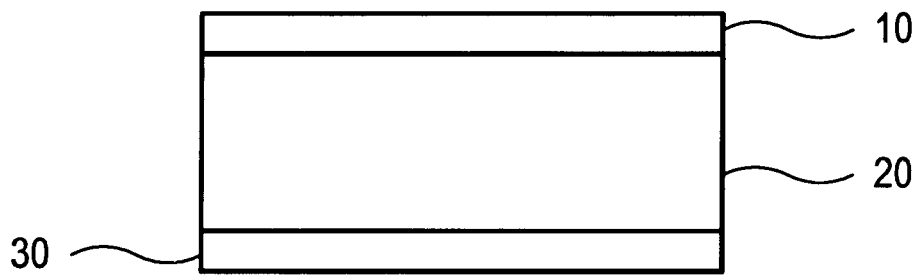
FIG. 1 shows a three layer film constructed according to one embodiment of the present invention.

The multilayer roll wrap films of the present invention are constructed with a cling layer, at least one inner polymeric layer and a non-cling layer. The multilayer roll wrap films of the present invention can be prepared as cast films by conventional coextrusion techniques.

Cling Layer

The cling layer of the roll wrap films of the present invention may be constructed of olefin polymer resins. Suitable polyethylene resins are those ethylenic copolymers that comprise a major proportion by weight of ethylene copolymerized with a minor proportion by weight of an alpha olefin monomer containing about 3 to about 12, preferably about 4 to about 10, and more preferably about 4 to about 8 carbon atoms. These resins have a polydispersity which is preferably in the range of from about 3 to about 7.

The cling layer is preferably comprised of ethyl methyl acrylate (EMA). EMA has a melt index of from about 2 to about 7, and preferably from about 3 to 5 g/10 min. as measured by ASTM D1238. The EMA resins have a density of from about 0.88 to about 0.94 g/cm³ and preferably from about 0.90 to about 0.92 g/cm³. These EA polymers generally have an acrylate content between about 2 to about 40%, preferably between about 10 to about 35%, by weight of the EA polymer. The acrylates useful in these polymers are those generally known in the art, preferably methyl, ethyl, and n-butyl acrylate. Ethylene-acrylate (EA) polymer films as shown in U.S. Pat. No. 5,049,423, which is incorporated herein by reference in its entirety, are contemplated for the cling layer. It is also contemplated that resins such as ethyl vinyl acetate (EVA) copolymer, high pressure low density polyethylene (HPLDPE) may be used in forming the cling layer of the roll wrap films of the present invention.

Other examples of ethylenic copolymers which may be used are those commonly referred to as linear low density polyethylenes (LLDPE) and very low density polyethylenes (VLDPE) may also comprise the cling layer. Preferably the ethylenic copolymers employed are those having from about 1 to about 20, preferably from about 1 to about 10 weight percent of said higher alpha olefin monomer copolymerized therein. In addition, the alpha olefin monomer employed in the ethylenic copolymer is selected from the group consisting of 1-butene, 3-methyl-1-butene, 3-methyl-1-pentene, 1-hexene, 4-methyl-1-pentene, 3-methyl-1-hexene, 1-octene and 1-decene. Particularly preferred are the 1-hexene alpha olefins. The LLDPE resins are prepared at relatively low pressures employing coordination-type catalysts. Reference may be made to U.S. Pat. Nos. 3,645,992, 4,076,698, 4,011,382, 4,163,831, 4,205,021, 4,302,565, 4,302,566, 4,359,561 and 4,522,987 for more details of the manufacture and properties of LLDPE resins including those which are particularly useful herein.

Common LLDPE resins that may be used to form such a cling layer include those having a relatively high weight percentage of n-hexane extractibles, as measured by the n-hexane extractibles method of 21 C.F.R. 177.1520. Generally, the LLDPE used in the cling layer herein will contain from about 2 to about 10, preferably from about 2 to about 8, more preferably from about 2.5 to about 5, weight percent of n-hexane extractibles.

The LLDPE resins that can be used in the cling layer herein have a density ranging from about 0.890 to about 0.940 g/cm$^3$, more commonly from about 0.90 to about 0.93 g/cm$^3$, and a melt index ($I_2$) of from about 1 to about 10 g/10 min., as determined by ASTM D1238. Preferred LLDPE resins possessing densities within the range from about 0.917 to about 0.920 gm/cm$^3$ and a melt index of from about 2.0 to about 5.0 g/10 min., as determined by ASTM D1238. Examples of such LLDPE resins include those set forth in U.S. Pat. No. 5,273,809, which is incorporated herein by reference in its entirety.

The VLDPE resins that may be used in the cling layer herein have a density ranging from about 0.875 to about 0.912 g/cm$^3$, more commonly from about 0.89 to about 0.91 g/cm$^3$, and a melt index of from about 0.5 to about 5 g/10 min., preferably from about 1 to about 3 g/10 min.

The LLDPE and VLDPE resins that can be used in the cling layer herein may also contain known and conventional cling additives to augment the cling property that, at least in the case of the particularity preferred resins, is inherently exhibited. Examples of useful cling additives include polyisobutylenes having a number average molecular weight in the range from about 1,000 to about 3,000, preferably about 1,200 to about 1,800, as measured by vapor phase osmometry, amorphous atactic polypropylenes, e.g., those having an average molecular weight of about 2000, and polyterpenes and ethylene-vinyl acetate copolymers containing from about 5 to about 15 weight percent copolymerized vinyl acetate. The optional cling additive can be present in the cling layer in a concentration of from about 0.5 to about 10 weight percent of the resin. Of course, other conventional film additives such as antioxidants, UV stabilizers, pigments, dyes, etc., may be present in the usual amounts.

Other known cling layers are contemplated for the present invention. In addition, the above-described resins may be blended in forming the cling layer of the present invention.

The cling layer of the film can be treated by such known and conventional postforming operations as corona discharge, chemical treatment, flame treatment, etc., to modify the printability or ink receptivity of the surface(s) or to impart other desirable characteristics thereto.

INNER POLYMERIC LAYER

The multilayer roll wrap films of the present invention are constructed with at least one inner polymeric layer comprising a polymer resin having a low polydispersity and located between the outer layers. The inner polymeric layer comprises a polymer having a low polydispersity. The low polydispersity polymer may be prepared from a partially crystalline polyethylene resin that is a polymer prepared with ethylene and at least one alpha olefin monomer, e.g., a copolymer or terpolymer. The alpha olefin monomer generally has from about 3 to about 12 carbon atoms, preferably from about 4 to about 10 carbon atoms, and more preferably from about 6 to about 8 carbon atoms. The alpha olefin comonomer content is generally below about 30 weight percent, preferably below about 20 weight percent, and more preferably from about 1 to about 15 weight percent. Exemplary comonomers include propylene, 1-butene, 1-pentene, 1-hexene, 3-methyl-1-pentene, 4-methyl-1-pentene, 1-octene, 1-decene, and 1-dodecene.

The low polydispersity polymer generally has the characteristics associated with an LLDPE material, however it has improved properties as explained more fully below. The low polydispersity polymer defined herein will have a density of from about 0.88 to about 0.94 g/cm$^3$, preferably from about 0.88 to about 0.93 g/cm$^3$, and more preferably from about 0.88 to about 0.925 g/cm$^3$.

The average molecular weight of the copolymer can generally range from about 20,000 to about 500,000, preferably from about 50,000 to about 200,000. The molecular weight is determined by commonly used techniques such as size exclusion chromatography or gel permeation chromatography. The low polydispersity polymer should have a molecular weight distribution, or polydispersity, ($M_w/M_n$, "MWD") within the range of about 1 to about 4, preferably about 1.5 to about 4, more preferably about 2 to about 4, and even more preferably from about 2 to about 3. The ratio of the third moment to the second moment, $M_z/M_w$, is generally below about 2.3, preferably below about 2.0, and more typically in the range of from about 1.6 to about 1.95. The melt flow ratio (MFR) of these resins, defined as $I_{20}/I_2$ and as determined in accordance to ASTM D-1238, is generally from about 12 to about 22, preferably from about 14 to about 20, and more preferably from about 16 to about 18. The melt index (MI), defined as the $I_2$ value, should be in the range of from about 0.5 to about 10 g/10 min., preferably from about 1 to about 5 g/10 min. If additional resin materials are to be incorporated with the low polydispersity polymer, it is preferred to maintain the level of the low polydispersity polymer to at least about 60 weight percent of the inner polymeric layer.

Useful low polydispersity polymers are available from, among others, Dow Chemical Company and Exxon Chemical Company who are producers of single site or constrained geometry catalyzed polyethylenes. These resins are commercially available as the AFFINITY and EXXACT polyethylenes (see Plastics World, p.33–36, January 1995), and also as the ENHANCED POLYETHYLENE and EXCEED line of resins. The manufacture of such polyethylenes, generally by way of employing a metallocene catalyst system, is set forth in, among others, U.S. Pat. Nos. 5,382,631, 5,380,810, 5,358,792, 5,206,075, 5,183,867, 5,124,418, 5,084,534, 5,079,205, 5,032,652, 5,026,798, 5,017,655, 5,006,500, 5,001,205, 4,937,301, 4,925,821, 4,871,523, 4,871,705, and 4,808,561, each of which is incorporated herein by reference in its entirety. These catalyst systems and their use to prepare such copolymer materials are also set forth in EP 0 600 425 A1 and PCT applications WO 94/25271 and 94/26816. The low polydispersity polymers thus produced generally have a crystalline content in excess of at least 10 weight percent, generally in excess of at least 15 weight percent.

The above patents and publications generally report that these catalysts contain one or more cyclopentadienyl moieties in combination with a transition metal. The metallocene catalyst may be represented by the general formula $C_cMA_aB_b$ wherein C is a substituted or unsubstituted cyclopentadienyl ring; M is a Group 3–10 metal or Lanthanide series element, generally a Group IVB, VB, or VIB metal; A and B are independently halogen, hydrocarbyl group, or hydrocarboxyl groups having 1–20 carbon atoms; a=0-3, b=0-3, and c=1-3. The reactions can take place in either gas phase, high pressure, slurry, or solution polymerization schemes.

At least one of the inner polymeric layers of the present invention is preferably constructed entirely with a low polydispersity polyethylene polymer, preferably produced by metallocene catalyst technology. However, the inner polymeric layer may also comprise a blend of the low polydispersity polymer with a second resin material. The second material may be an olefin polymer resin. For example, this may include, but is not limited to, LLDPE, LDPE, HPLDPE, VLDPE, propylene resins or combinations thereof. The second resin material is preferably a LLDPE resin having a density of from about 0.89 to about 0.94 g/cm$^3$, a LDPE resin having a density of from about 0.90 to about 0.935 g/cm$^3$, a VLDPE resin having a density of from about 0.88 to about 0.91 g/cm$^3$. The comonomer for the second resin material preferably has from about 4 to about 10, more preferably about 6 to about 8 carbon atoms. If the second resin material is to be incorporated with the metallocene-catalyzed resin, it is preferred to maintain the level of the metallocene-catalyzed resin to at least about 60 wt. % of the inner polymeric layer. The resultant blended polymer resin maintains the desired properties of the metallocene-catalyzed resin material and may be more economical for certain applications.

Additionally interior layers are also contemplated in the present invention to provide barrier properties or cost reductions.

NON-CLING LAYER

The multilayer roll wrap films of the present invention contains at least one outer non-cling layer which is located adjacent to the inner polymeric layer. The non-cling layer provides tensile strength, better stretched optics, and resistance to tiger striping.

The non-cling layer is preferably comprised of a high pressure, low density polyethylene (HPLDPE) having a density of from about 0.88 to about 0.935 g/cm$^3$ and preferably from about 0.90 to about 0.935 g/cm$^3$. The LDPE has a melt index of from about 0.5 to about 6, and preferably from about 1 to about 3 g/10 min. as measured by ASTM D1238.

It is also contemplated that polypropylenes may comprise the non-cling layer of the present invention. The polypropylene, which is generally isotatic polypropylene, has a density from about 0.89 to about 0.91 g/cm$^3$. The polypropylene has a melt flow ratio, defined as $I_{20}/I_2$ and as determined in accordance with ASTM D-1238, of from about 2 to about 25 and preferably from about 5 to about 15 g/10 min.

It is also contemplated that the non-cling layer may be comprised of random copolymers of propylene and ethylene with an ethylene content in the range of from about 2 to about 6 wt. %, preferably from about 2.5 to about 5.0 wt. % and most preferably from about 3.0 to about 4.5 wt. % of the non-cling layer. The random ethylene-propylene copolymers have a melt flow ratio of from about 2 to about 15, preferably from about 3 to about 11, and more preferably from about 4 to about 7.

Alternatively, the non-cling layer may be prepared with heterophasic copolymers of propylene and ethylene. These heterophasic copolymers comprise a propylene material with domains of ethylene interspersed. Useful heterophasic copolymers of propylene and ethylene are available from, among others, Himont, Inc. The heterophasic copolymers of propylene and ethylene have a melt flow ratio, defined as $I_{20}/I_2$ and as determined in accordance to ASTM D-1238, of from about 10 to about 18, preferably from about 11 to about 16 and more preferably from about 12 to about 15. The ethylene content is in a range from about 12 to about 30 wt. %, preferably about 15 to about 26 wt. % and more preferably about 17 to about 24 wt. % of the non-cling layer.

The non-cling layer of the film can be treated by such known and conventional post-forming operations as corona discharge, chemical treatment, flame treatment, etc., to modify the printability or ink receptivity of the surface(s) or to impart other desirable characteristics thereto.

It is contemplated that the non-cling layer may include any of several anticling, slip or antiblock additives to promote slip characteristics in the non-cling layer. Such additives include silicas, talcs, diatomaceous earth, silicates, lubricants, etc. These additives are generally blended with the resin material in an amount of from about 100–20,000 ppm.

The roll wrap films of the present invention can be constructed to contain a plurality of layers in various combinations. According to one embodiment, the roll wrap film will be of an A\B\C construction as depicted in FIG. 1 wherein the film layer (10) is the outer cling layer (layer A), film layer (20) is the inner polymeric layer (layer B), and film layer (30) is the outer non-cling layer (layer C).

Figure 2:
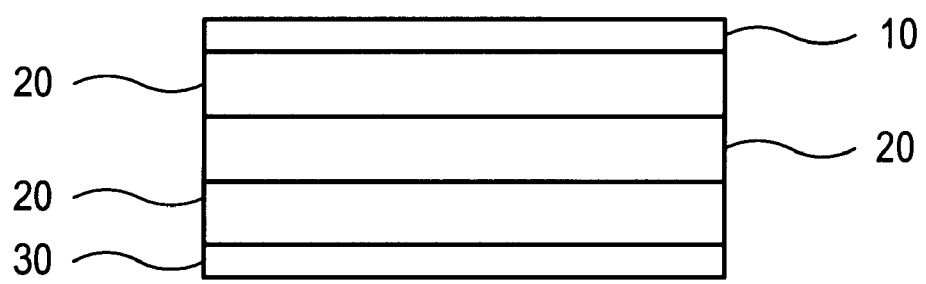
FIG. 2 shows a five layer film constructed according to one embodiment of the present invention.

According to other embodiments, the roll wrap film may be of an A\B\B\C construction such as depicted in FIG. 2 where the film layers (10), (20), (30), are the cling, inner polymeric, and non-cling layers, respectively, as previously described with respect to FIG. 1. Alternatively, roll wrap films may be of an A\B\B\C or an A/B/A/B/C with other types of multi-layered constructions being contemplated.

ROLL WRAP PROPERTIES

The roll wrap film of the present invention has relatively high puncture resistance, as measured by the F-50 dart drop test procedure (ASTM D1709). It is the experience of those skilled in the art that the F-50 dart drop test is well correlated to the end-use puncture resistance of roll wrap films. The F-50 dart drop value of the films is at least about 600 grams, preferably at least about 800 grams, and more preferably from at least about 1,000 grams.

The roll wrap film has a cling force of at least about 150, preferably at least about 175, more preferably at least about 200, and in some cases as high as about 250 grams/inch as determined by ASTM D5458-94. Generally, the cling force of the roll wrap film between the outer layers (measured from inside to outside [I/O]) is from about 160 to about 260 grams/inch. The cling force as measured from outside to outside (O/O) does not have a cling value.

The roll wrap film of this invention can, if desired, be provided in the non-stretched, i.e., unoriented, or at most only modestly stretched state prior to use. The films of the present invention are capable of being stretched from at least about 50, preferably at least about 150 and most preferably at least about 250 linear percent.

The roll wrap films of the present invention are preferably constructed so that the transverse direction tear resistance (TD tear), as determined by ASTM D1922, is at least about 400 g/mil, preferably at least about 450 g/mil, more preferably at least about 500 g/mil. The machine direction tear resistance (MD tear) as determined by ASTM D1922, of the film is generally at least about 150 g/mil, preferably at least about 200 g/mil, and more preferably at least about 250 g/mil.

The roll wrap films of the present invention are preferably constructed so that the stretch force as measured by the MD force at 200% is at least about 1,200 psi and preferably is at least about 1,400 psi. The roll wrap films of the present invention have very little or no tiger striping at 250% stretching on a prestretched roll wrap machine and have excellent stretched optics.

The roll wrap film configurations are constructed according to conventional practices. Generally, the preferred processing technique is to coextrude and cast the films in a simultaneous fashion, however in some cases it may be appropriate to first coextrude at least two film layers and thereafter extrusion coat the remaining film layers. It is preferred to employ known and conventional techniques of coextrusion to assemble the composite structures of the films of this invention. Reference may be made to U.S. Pat. No. 3,748,962, the contents of which are incorporated herein by reference for details of a coextrusion procedure which can be employed in the fabrication of a multilayer film in accordance with this invention. Generally, the resin materials are heated to their molten state and their viscosities are coordinated to prepare multilayer films in a uniform manner. The molten materials are conveyed to a coextrusion adapter that combines the molten materials to form a multilayer coextruded structure. The layered polymeric material is transferred through an extrusion die is opened to a predetermined gap commonly in the range of between from 0.05 in. (0.13 cm) to about 0.012 in. (0.03 cm). The material is then drawn down to the intended gauge thickness by means of a primary chill or casting roll maintained at about 60 to about 130° F. (15–55° C.). Typical draw down ratios range from about 5:1 to about 40:1.

The overall thickness of the roll wrap film can vary widely according to end use specifications, but is generally in the range of a typical thickness for roll wrap films. Conventional for such films is a thickness of from about 1 to about 4 mils, and preferably is from about 1.5 to about 3 mils and more preferably from about 2 to about 3 mils.

In the present invention wherein the multilayer films are of a coextruded nature, the cling layer may comprise from about 5 to about 25, preferably from about 5 to about 20, and more preferably from about 10 to about 15 weight percent of the roll wrap film. The inner polymeric layer(s) may comprise from about 50 to about 90, preferably from about 50 to about 80, and more preferably from about 60 to about 75 weight percent of the roll wrap film. The non-cling layer will account for the balance of the film, and generally will comprise from about 5 to about 25, preferably from about 5 to about 20, and more preferably from about 10 to about 15 weight percent of the roll wrap film.

EXAMPLE

A number of tests were done to demonstrate various aspects of the multilayer films of the present invention. The procedures utilized are set forth in Table 1.

TABLE 1

ROLL WRAP FILM TEST PROCEDURES

| TEST PROCEDURE | ASTM TEST METHOD |
|---|---|
| Tensile Yield Machine Direction (MD) and Transverse Direction (TD) | D882 |
| Tensile Ultimate MD | D882 |
| Tensile Elongation MD | D882 |
| Tensile MD Force @ 200% Stretch | D882 |
| Elmendorf Tear MD | D1922 |
| Elmendorf Tear TD | D1922 |
| F-50 Dart Drop | D1709 |
| Instron Peel Cling | D5458 |

The films were prepared using a commercially available cast film line machine. The material melt temperatures ranged from about 380 to about 580° F. and were chosen to match melt viscosities of the various resins. The melts were conveyed to a coextrusion adapter that combines the melt flows into a multilayer coextruded structure. This layered flow was distributed through a single manifold film extrusion die to the required width. The die gap opening was nominally 0.025 inches. The material was drawn down to the final gauge. The material draw down ratio was about 31:1 for the 0.8 mil films. An air knife was used to pin the melt exiting the die opening to a primary chill roll maintained at about 90° F.

The films were tested for performance in a stretch wrapper constructed with equipment to determine various film properties during the stretching operation. The testing was conducted at rates similar to those employed by commercial equipment. The film width was 20 inches (51 cm) for this test machine. The machine direction (MD) force at 200% stretch, forces values at breakage, and maximum stretch % were determined.

The results of the tests appear in Table 2 in which the inventive roll wrap films are inventive films 1–5. All of the films 1–5 were coextruded in a five layer construction of A/B/B/B/C with a five layer feed block. However, the results obtained in a five layer construction of A/B/B/B/C would be essentially the same as in a three layer embodiment of A/B/C. The outer film layer A (non-cling layer) of the films 1–5 was comprised of a high pressure, low density polyethylene (HPLDPE) resin. The HPLDPE resin in layer A had a density of 0.921 g/cm$^3$ and a melt index ($I_2$) of 2 g/10 min.

The inner polymeric layers B of each films 1–5 were comprised of 100% metallocene-catalyzed linear low density polyethylene or "mLLDPE". Film layers B were formed from an alpha olefin comonomer of 1-hexene. The mLLDPE resin in layers B had a density of 0.918 g/cm$^3$ and a melt index ($I_2$) of 2 g/10 min. The outer cling layer C of films 1–5 was comprised of ethyl methyl acrylate (EMA). The EMA resin had a density of 0.908 g/cm$^3$ and a melt index ($I_2$) of 5 g/ 10 min.

Roll wrap films 1, 2, 4 and 5 comprised about 15 wt. % of layer A (non-cling film layer), about 70 wt. % of layers B (inner layers) and about 15 wt. % of layer C (cling layer). Roll wrap film 3 comprised about 15 wt. % of layer A, about 73 wt. % of layer B, and 12 wt. % of layer C as described above. Films 1–5 ranged in thickness from 1.5 mil to 3.0 mil.

All of the films 1–5 had very light tiger striping when stretched at 250%. The machine direction (MD) tear and transverse direction (TD) tear were excellent for roll wrap films. Specifically, all of the Films 2–5 had MD tear values greater than 200 g/mil and TD tear values greater than 450 g/mil. The puncture resistance, as measured by the F-50 dart drop, of the films 1, 2, 4 and 5 was greater than 900 grams.

TABLE 2

|  | Film 1 | Film 2 | Film 3 | Film 4 | Film 5 |
|---|---|---|---|---|---|
| INVENTIVE ROLL WRAP FILM | | | | | |
| Gauge (mils) | 1.5 | 2.0 | 2.0 | 2.5 | 3.0 |
| Layer Configuration | A/B/B/B/C | A/B/B/B/C | A/B/B/B/C | A/B/B/B/C | A/B/B/B/C |
| Layer Structure % (A-B-C) | 15-70-15 | 15-70-15 | 15-73-12 | 15-70-15 | 15-70-15 |
| Layer "A" Resin | 2.0 MI HPLDPE | 2.0 MI HPLDPE | 2.0 MI HPLDPE | 2.0 MI HPLDPE | 2.0 MI HPLDPE |
| Layer "B" Resin | 2.0 MI mLLDPE | 2.0 MI mLLDPE | 2.0 MI mLLDPE | 2.0 MI mLLDPE | 2.0 MI mLLDPE |
| Layer "C" Resin | 5.0 MI EMA | 5.0 MI EMA | 5.0 MI EMA | 5.0 MI EMA | 5.0 MI EMA |
| LAB ANALYSIS | | | | | |
| MD Force @ 200% (psi) | 1599 | 1494 | 1718 | 1350 | 1365 |
| MD Ultimate (psi) | 5655 | 5005 | 6609 | 5365 | 5265 |
| MD Elongation (%) | 742 | 806 | 797 | 896 | 946 |
| MD Tear (grams/mil) | 169 | 209 | 225 | 265 | 279 |
| TD Tear (grams/mil) | 518 | 507 | 460 | 480 | 446 |
| F-50 Dart Drop (grams) | 974.8 | 1032.0 | 694.5 | 1035[1] | 1362[1] |
| Unstretched Cling I/O (grams) | 215.8 | 262.2 | 229.7 | 186.6 | 161.6 |
| Unstretched Cling O/O (grams) | No Cling | No Cling | No Cling | No Cling | No Cling |
| ROLL WRAP TESTER | | | | | |
| MD Force @ 200% (lbs/in) | N/A | 4.6 | 4.8 | N/A | 6.1 |
| Maximum Force (lbs/in) | N/A | 5.3 | 6.1 | N/A | 6.8 |
| Maximum Stretch (%) | N/A | 421 | 426 | N/A | 411 |
| Tigerspring Level @ 250% Stretching | Very light | Very light | Very light | Very light | Very light |

[1]This F-50 dart drop value was a maximum reading.

What is claimed is:

1. A multilayer, thermoplastic roll wrap film containing at least three polymeric film layers, comprising:
   (a) an outer polymeric cling layer;
   (b) an outer non-cling layer comprising a high pressure, low density polyethylene having a melt index of from about 0.5 to about 6 g/10 min.; and
   (c) at least one inner polymeric layer, located between said outer cling layer and said non-cling, layer, comprising a low polydispersity polymer, said low polydispersity polymer having a polydispersity of from about 1 to about 4, a melt index ($I_2$) of from about 0.5 to about 10 g/10 min., and a melt flow ratio ($I_{20}/I_2$) of from about 12 to about 22;
   so as to produce a roll wrap film having a transverse tear resistance of at least 400 grams/mil as measured by ASTM D1922, a machine direction tear resistance as measured by ASTM D1922 of at least 150 grams/mil, a F-50 dart drop of at least 600 grams as measured by ASTM D1709 and a thickness of from about 1.5 to about 3 mil.

2. The roll wrap film of claim 1 wherein said high pressure, low density polyethylene has a melt index of from about 1 to about 3 g/10 min.

3. The roll wrap film of claim 1 wherein said polydispersity of said low polydispersity polymer is in the range of from about 1.5 to about 4.

4. The roll wrap film of claim 3 wherein said polydispersity of said low polydispersity polymer is in the range of from about 2 to about 3.

5. The roll wrap film of claim 1 wherein the density of said low polydispersity polymer is in the range of from about 0.88 to about 0.93 g/cm³.

6. The roll wrap film of claim 5 wherein the density of said low polydispersity polymer is in the range of from about 0.88 to about 0.925 g/cm³.

7. The roll wrap film of claim 1 wherein the melt index of said low polydispersity polymer is in the range of about 1.5 to about 4 g/10 min.

8. The roll wrap film of claim 7 wherein the melt index of said low polydispersity polymer is in the range of about 2 to about 4 g/10 min.

9. The roll wrap film of claim 1 wherein the melt flow ratio of said low polydispersity polymer is in the range of from about 14 to about 20.

10. The roll wrap film of claim 9 wherein the melt flow ratio of said low polydispersity polymer is in the range of from about 16 to about 18.

11. The roll wrap film of claim 1 wherein said low polydispersity polymer is made with a metallocene catalyst.

12. The roll wrap film of claim 1 wherein said cling layer has sufficient cling resulting from inherent cling alone, cling additives alone or a combination thereof so as to produce a cling force to said non-cling layer of at least about 150 grams/inch.

13. The roll wrap film of claim 1 wherein the transverse direction tear resistance of the roll wrap film is at least about 450 g/mil.

14. The roll wrap film of claim 1 wherein the machine direction tear resistance of the roll wrap film is at least about 200 g/mil.

15. The roll wrap film of claim 1 wherein the low polydispersity polymer is a polyethylene copolymer or terpolymer.

16. The roll wrap film of claim 1 wherein the outer non-cling layer consists essentially of said high pressure, low density polyethylene.

17. The roll wrap film of claim 1 wherein the cling layer is comprised of an ethyl methyl acrylate copolymer.

18. The roll wrap film of the claim 17 wherein said ethyl methyl acrylate copolymer has a melt index of from about 2 to about 7 g/10 min.

19. The roll wrap film of claim 18 wherein said ethyl methyl acrylate copolymer has a melt index of from about 3 to about 5 g/10 min.

20. The roll wrap film of claim 1 wherein said cling layer is comprised of ethyl methyl acrylate having a melt index of from about 2 to about 7 g/10 min., said non-cling layer consists essentially of a high pressure, low density polyethylene with a melt index of from about 1 to about 3 g/10 min., said inner polymeric layer comprises a low polydispersity polymer having a polydispersity in a range from about 2 to about 4, and said inner polymeric layer comprises at least about 60 weight percent of said low polydispersity polymer.

21. The roll wrap film of claim 1 wherein said outer cling layer is an olefinic polymeric resin.

22. The roll wrap film of claim 21, wherein said outer cling layer is a polymer comprising at least two monomers, wherein said first monomer is ethylene, in a major amount by weight, and said second monomer is an alpha olefin of from about 3 to about 12 carbon atoms, in a minor amount by weight.

23. The roll wrap film of claim 1 wherein said outer cling layer is as polymer ethylene acrylate polymers, an ethyl vinyl acetate copolymer, a high pressure low density polyethylene, a linear low density polyethylene, a very low density polyethylene, and combinations thereof.

24. The roll wrap film of claim 23 wherein said outer cling layer is a linear low density polyethylene, a very low density polyethylene, or the combination thereof.

25. The roll wrap film of claim 24 wherein said linear low density polyethylene has a density of from about 0.89 to about 0.94 g/cm$^3$ and said very low density polyethylene has a density of from about 0.875 to about 0.912 g/cm$^3$.

26. The roll wrap film of claim 1 wherein said inner polymeric layer comprises at least 60 wt. % low polydispersity polymer.

27. The roll wrap film of claim 1 wherein said inner polymeric layer comprises a blend of said low polydispersity polymer and an olefinic polymeric resin.

28. The roll wrap film of claim 1 wherein said inner polymeric layer is made of about 100 wt. % of low polydispersity polymer.

29. The roll wrap film of claim 1 wherein said outer non-cling layer consists of said high pressure, low density polyethylene.

30. The roll wrap film of claim 1 wherein said non-cling layer has anticling, slip or antiblock additives.

31. The roll wrap film of claim 1 wherein the roll wrap film ha s an MD force @ 200% of at least about 1,400 psi.

32. The roll wrap film of claim 1 wherein the roll wrap film has a thickness of from about 2 to about 3 mils.

33. The roll wrap film of claim 1 wherein the roll wrap film is made by the process of coextruding and casting the film.

34. The roll wrap film of claim 1 wherein the roll wrap film is made by the process of coextruding at least two of the layers and extrusion coating the remaining layers thereafter.

35. The roll wrap film of claim 1 wherein the roll wrap film comprises from about 5 to about 15 wt. % of said outer non-cling layer.

36. The roll wrap film of claim 1 wherein the roll wrap film comprises from about 5 to about 20 wt. % of said outer non-cling layer, from about 5 to about 20 wt. % of said outer cling layer, and from about 60 to about 75 wt. % of said inner polymeric layer.

37. The roll wrap film of claim 1 wherein said outer cling layer consists essentially of an ethyl methyl acetate copolymer or a blend of a high pressure, low density polyethylene and a very low density polyethylene, said outer non-cling layer consists essentially of said high pressure, low density polyethylene, and said inner polymeric layer consists essentially of said low polydispersity polymer.

38. The roll wrap film of claim 1 wherein said outer non-cling layer consists essentially of said high pressure, low density polyethylene, the roll wrap film has an MD force @ 200% of at least 1,400 psi., and the roll wrap film is made by the process of coextruding and casting the film.

39. A method for wrapping an article, comprising:
wrapping the article with a multilayer, thermoplastic roll wrap film containing at least three polymeric film layers, comprising
(a) an outer polymeric cling layer;
(b) an outer non-cling layer comprising a high pressure, low density polyethylene having a melt index of from about 0.5 to about 6 g/10 min.;
(c) at least one inner polymeric layer, located between said outer cling layer and said outer non-cling layer, comprising a low polydispersity polymer, said low polydispersity polymer having a polydispersity of from about 1 to about 4, a melt index ($I_2$) of from about 0.5 to about 10 g/10 min., and a melt flow ratio ($I_{20}/I_2$) of from about 12 to about 22;
so as to produce a roll wrap film having a transverse tear resistance of at least 400 grams/mil as measured by ASTM D1922, a machine direction tear resistance as measured by ASTM D1922 of at least 150 grams/mil, a F-50 dart drop of at least 600 grams as measured by ASTM D1709 and has a thickness of from about 1.5 to about 3 mil; and
whereby said multilayer roll wrap film is stretched during the wrapping step.

40. The method of claim 39 wherein said outer cling layer is selected from ethylene acrylate polymers, an ethyl vinyl acetate copolymer, a high pressure low density polyethylene, a linear low density polyethylene, a very low density polyethylene, and combinations thereof.

41. The method of claim 40 wherein said outer cling layer is a linear low density polyethylene, a very low density polyethylene, or the combination thereof.

42. The method of claim 39 wherein said inner polymeric layer comprises at least 60 wt. % low polydispersity polymer.

43. The method of claim 39 wherein said non-cling layer consists essentially of said high pressure, low density polyethylene.

44. The method of claim 39 wherein said non-cling layer has anticling, slip or antiblock additives.

45. The method of claim 39 wherein the roll wrap film has an MD force @ 200% of at least about 1,400 psi.

46. The method of claim 39 wherein the roll wrap film is made by the process of coextruding and casting the film.

47. The method of claim 39 wherein the roll wrap film comprises from about 5 to about 15 wt. % of said outer non-cling layer.

48. The method of claim 39 wherein said outer cling layer consists essentially of an ethyl methyl acetate copolymer or a blend of a high pressure, low density polyethylene and a very low density polyethylene, said outer non-cling layer consists essentially of said high pressure, low density polyethylene, and said inner polymeric layer consists essentially of said low polydispersity polymer.

49. The method of claim 39 wherein said outer non-cling layer consists essentially of said high pressure, low density polyethylene, the roll wrap film has an MD force @ 200% of at least 1,400 psi., and the roll wrap film is made by the process of coextruding and casting the film.

50. A multilayer, thermoplastic roll wrap film containing at least three polymeric film layers, comprising:
(a) an outer polymeric cling layer;
(b) an outer non-cling layer comprising a polypropylene having a melt flow rate of from about 2 to about 25; and (c) at least one inner polymeric layer, located between said cling layer and said non-cling layer, comprising a low polydispersity polymer, said low polydispersity polymer having a polydispersity of from about 1 to about 4, a melt index ($I_2$) of from about 0.5 to about 10 g/10 min., and a melt flow ratio ($I_{20}/I_2$) of from about 12 to about 22;

so as to produce a roll wrap film having a transverse tear resistance of at least 400 grams/mil as measured by ASTM D1922, a machine direction tear resistance as measured by ASTM D1922 of at least 150 grams/mil and a F-50 dart drop of at least 600 grams as measured by ASTM D1709.

51. The roll wrap film of claim 50 wherein said polypropylene has a density of from about 0.89 to about 0.91 g/cm$^3$.

52. The roll wrap film of claim 22 wherein the melt flow rate of said polypropylene is from about 5 to about 15.

53. The roll wrap film of claim 50 wherein said low polydispersity polymer is made with a metallocene catalyst.

54. The roll wrap film of claim 50 wherein said cling layer has sufficient cling resulting from inherent cling alone, cling additives alone or a combination thereof so as to produce a cling force to said non-cling layer of at least about 150 grams/inch.

55. The roll wrap film of claim 50 wherein said outer cling layer is an olefinic polymeric resin.

56. The roll wrap film of claim 50 wherein said outer cling layer is selected from ethylene acrylate polymers, an ethyl vinyl acetate copolymer, a high pressure low density polyethylene, a linear low density polyethylene, a very low density polyethylene, and combinations thereof.

57. The roll wrap film of claim 56 wherein said outer cling layer is a linear low density polyethylene, a very low density polyethylene, or the combination thereof.

58. The roll wrap film of claim 50 wherein said inner polymeric layer comprises at least 60 wt. % low polydispersity polymer.

59. The roll wrap film of claim 58 wherein said inner polymeric layer is made of about 100 wt. % of low polydispersity polymer.

60. The roll wrap film of claim 50 wherein said non-cling layer consists essentially of said polypropylene.

61. The roll wrap film of claim 50 wherein said non-cling layer has anticling, slip or antiblock additives.

62. The roll wrap film of claim 50 wherein the roll wrap film has an MD force @ 200% of at least about 1,400 psi.

63. The roll wrap film of claim 50 wherein the roll wrap film has a thickness of from about 1.5 to about 3 mils.

64. The roll wrap film of claim 50, wherein the roll wrap film is made by the process of coextruding and casting the film.

65. The roll wrap film of claim 50, wherein the roll wrap film comprises from about 5 to about 20 wt. % of said outer non-cling layer, from about 5 to about 20 wt. % of said outer cling layer, and from about 60 to about 75 wt. % of said inner polymeric layer.

66. A multilayer, thermoplastic roll wrap film containing at least three polymeric film layers, comprising:
   (a) an outer polymeric cling layer;
   (b) an outer non-cling layer comprising either a random ethylene-propylene copolymer having a melt flow rate of from about 2 to about 15, or an heterophasic ethylene coplymer of propylene and ethylene having a melt flow rate of from about 10 to about 18; and
   (c) at least one inner polymeric layer, located between said outer cling layer and said non-cling layer, comprising a low polydispersity polymer, said low polydispersity polymer having a polydispersity of from about 1 to about 4, a melt index ($I_2$) of from about 0.5 to about 10 g/10 min., and a melt flow ratio ($I_{20}/I_2$) of from about 12 to about 22;

so as to produce a roll wrap film having a transverse tear resistance of at least 400 grams/mil as measured by ASTM D1922, a machine direction tear resistance as measured by ASTM D1922 of at least 150 grams/mil, and an F-50 dart drop of at least 600 grams as measured by ASTM D1709.

67. The roll wrap film of claim 66 wherein said non-cling layer comprises a random ethylene-propylene copolymer having a melt flow ratio of from about 3 to about 11.

68. The roll wrap film of claim 66 wherein said non-cling layer comprises a heterophasic copolymer of propylene and ethylene having a melt flow ratio of from about 11 to about 16.

69. The roll wrap film of claim 66 wherein said low polydispersity polymer is made with a metallocene catalyst.

70. The roll wrap film of claim 66 wherein said cling layer has sufficient cling resulting from inherent cling alone, cling additives alone or a combination thereof so as to produce a cling force to said non-cling layer of at least about 150 grams/inch.

71. The roll wrap film of claim 66 wherein said outer cling layer is an olefinic polymeric resin.

72. The roll wrap film of claim 66 wherein said outer cling layer is selected from ethylene acrylate polymers, an ethyl vinyl acetate copolymer, a high pressure low density polyethylene, a linear low density polyethylene, a very low density polyethylene, and combinations thereof.

73. The roll wrap film of claim 72 wherein said outer cling layer is a linear low density polyethylene, a very low density polyethylene, or the combination thereof.

74. The roll wrap film of claim 66 wherein said inner polymeric layer comprises at least 60 wt. % low polydispersity polymer.

75. The roll wrap film of claim 74 wherein said inner polymeric layer is made of about 100 wt. % of low polydispersity polymer.

76. The roll wrap film of claim 66 wherein said non-cling layer has anticling, slip or antiblock additives.

77. The roll wrap film of claim 66 wherein the roll wrap film has an MD force @ 200% of at least about 1,400 psi.

78. The roll wrap film of claim 66 wherein the roll wrap film has a thickness of from about 1.5 to about 3 mils.

79. The roll wrap film of claim 66 wherein the roll wrap film is made by the process of coextruding and casting the film.

80. The roll wrap film of claim 66 wherein the roll wrap film comprises from about 5 to about 20 wt. % of said outer non-cling layer, from about 5 to about 20 wt. % of said outer cling layer, and from about 60 to about 75 wt. % of said inner polymeric layer.

* * * * *